US009424255B2

(12) United States Patent
Pengelly et al.

(10) Patent No.: US 9,424,255 B2
(45) Date of Patent: Aug. 23, 2016

(54) SERVER-ASSISTED OBJECT RECOGNITION AND TRACKING FOR MOBILE DEVICES

(75) Inventors: Robert Pengelly, Seattle, WA (US); Stephen Cosman, Redmond, WA (US); Shawn M. Brown, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 127 days.

(21) Appl. No.: 13/289,598

(22) Filed: Nov. 4, 2011

(65) Prior Publication Data

US 2013/0114849 A1  May 9, 2013

(51) Int. Cl.
G06K 9/00 (2006.01)
G06F 17/28 (2006.01)
G06T 7/20 (2006.01)

(52) U.S. Cl.
CPC .......... *G06F 17/289* (2013.01); *G06K 9/00671* (2013.01); *G06K 9/00979* (2013.01); *G06T 7/20* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,907,835 A * | 5/1999 | Yokomizo et al. | |
| 6,965,682 B1 * | 11/2005 | Davis et al. | 382/100 |
| 7,113,618 B2 | 9/2006 | Junkins et al. | |
| 7,436,887 B2 * | 10/2008 | Yeredor et al. | 375/240.01 |
| 7,751,805 B2 | 7/2010 | Neven et al. | |
| 2007/0104348 A1 * | 5/2007 | Cohen | 382/100 |
| 2007/0150403 A1 | 6/2007 | Mock et al. | |
| 2008/0118162 A1 * | 5/2008 | Siegemund | 382/229 |
| 2008/0231709 A1 * | 9/2008 | Brown et al. | 348/169 |
| 2008/0233980 A1 * | 9/2008 | Englund et al. | 455/466 |
| 2008/0243473 A1 * | 10/2008 | Boyd et al. | 704/2 |
| 2009/0092287 A1 * | 4/2009 | Moraleda | G06F 17/30247 382/103 |
| 2009/0106016 A1 * | 4/2009 | Athsani et al. | 704/3 |
| 2009/0128311 A1 * | 5/2009 | Nishimura et al. | 340/435 |
| 2009/0285444 A1 * | 11/2009 | Erol et al. | 382/100 |
| 2010/0046842 A1 * | 2/2010 | Conwell | G06F 17/30265 382/218 |
| 2010/0103241 A1 | 4/2010 | Linaker | |
| 2010/0128131 A1 * | 5/2010 | Tenchio et al. | 348/207.1 |
| 2010/0215261 A1 * | 8/2010 | Kim et al. | 382/165 |
| 2010/0260426 A1 * | 10/2010 | Huang et al. | 382/218 |
| 2010/0331043 A1 * | 12/2010 | Chapman et al. | 455/556.1 |
| 2011/0081083 A1 * | 4/2011 | Lee et al. | 382/182 |
| 2011/0082728 A1 * | 4/2011 | Melikian | 705/14.13 |
| 2011/0181779 A1 * | 7/2011 | Park et al. | 348/563 |

(Continued)

OTHER PUBLICATIONS

Elmore, Megan, and Margaret Martonosi. "A Morphological Image Preprocessing Suite for OCR on Natural Scene Images." (2008).*

(Continued)

*Primary Examiner* — Sumati Lefkowitz
*Assistant Examiner* — Carol Wang
(74) *Attorney, Agent, or Firm* — Judy Yee; Micky Minhas

(57) ABSTRACT

Exemplary embodiments for performing server-assisted object recognition and tracking are disclosed herein. For example, in certain embodiments of the disclosed technology, one or more objects are efficiently recognized and tracked on a mobile device by using a remote server that can provide high capacity computing and storage resources. With the benefit of high-speed image processing on a remote server and high-bandwidth communication networks connecting the mobile device and the remote server, it is possible to identify an object and to track changes in the object's characteristics or location, so that a user experiences seamless, real-time tracking.

20 Claims, 11 Drawing Sheets

(56) References Cited

U.S. PATENT DOCUMENTS

| | | | |
|---|---|---|---|
| 2011/0216179 A1* | 9/2011 | Dialameh et al. | 348/62 |
| 2012/0088543 A1* | 4/2012 | Lindner et al. | 455/556.1 |
| 2012/0243732 A1* | 9/2012 | Swaminathan | G06T 7/2033 |
| | | | 382/103 |

OTHER PUBLICATIONS

Kumar, Shyam Sunder, Min Sun, and Silvio Savarese. "Mobile object detection through client-server based vote transfer." In Computer Vision and Pattern Recognition (CVPR), 2012 IEEE Conference on, pp. 3290-3297. IEEE, 2012.*

Jung, Jinki, Jaewon Ha, Sang-Wook Lee, Francisco A. Rojas, and Hyun S. Yang. "Efficient mobile AR technology using scalable recognition and tracking based on server-client model." Computers & Graphics 36, No. 3 (2012): 131-139.*

Gausemeier et al., "Development of a Real Time Image Based Object Recognition Method for Mobile AR-Devices," Association for Computing Machinery, Inc., 133-139, (2003).

Ismail et al., "Mobile to Server Face Recognition: A System Overview," World Academy of Science, Engineering and Technology, 69:767-771, (2010).

Said et al., "Multi-Object Color Tracking for Multi-Robot Systems Enhancement," 13th International Conference on Aerospace Sciences & Aviation Technology, ASAT-13-RS-01:11 pp., (May 26, 2009).

Gammeter et al., "Server-side object recognition and client-side object tracking for mobile augmented reality," IEEE, Computer Vision and Pattern Recognition Proceedings, 8 pp., (Jun. 13, 2010).

* cited by examiner

SERVER-ASSISTED OBJECT RECOGNITION AND TRACKING FOR MOBILE DEVICES

FIELD

This disclosure pertains to visual recognition and tracking of objects that appear in a camera viewfinder of a mobile electronic device.

BACKGROUND

Today's mobile electronic devices are capable of performing a wide variety of functions. For example, "smartphones" are mobile devices that combine wireless communication functions with other functions, such as mapping and navigation using a global positioning system (GPS), wireless network access (e.g., electronic mail and Internet web browsing), digital imaging, digital audio playback, personal digital assistant (PDA) functions (e.g., synchronized calendaring), and the like. Although many mobile devices are hand held, they can also have a larger form factor. For example, they may take the form of tablet computers, laptop computers, portable gaming devices, or other similar electronic devices capable of remote communication. A common feature of smartphones and other similar mobile devices is a built-in digital camera for receiving and recording image data. In addition to capturing photographs, the digital camera can be used as a generic visual input device, thus greatly expanding the capability of the mobile device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Although the disclosed technology is particularly suited to implementation on mobile devices, it can be applied to a variety of electronic devices. For example, the disclosed technology can be used in connection with an image sensor attached to a gaming console, television, robotic device, or other device or machine that uses machine vision (e.g., automobiles, airplanes, factory vehicles, factory equipment, or other such machinery). Similarly, although embodiments of the disclosed technology concern a visual tracking feature, the "augmented reality" (AR) technology disclosed herein is not limited to such an implementation, but can also be implemented in conjunction with other device features or programs.

Among the embodiments disclosed herein are methods and devices that provide a way to efficiently provide real-time recognition and tracking of objects in a scene or digital image over time, from one image frame to the next. For example, in one embodiment, a system comprising a remote server and a mobile electronic device operates to recognize multiple objects in a scene and to compare a current view to a previous view in order to track the movement of the objects. The mobile device, equipped with a camera having a viewfinder, can send selected portions of image data to the remote server for image analysis and object recognition. The remote server can then return processed object data for display on the mobile device. Once an object is identified, it can be tagged or highlighted so that it can be followed automatically in subsequent frames. "Objects" include, for example, vehicles, buildings, landmarks, landscapes, animals, human beings, human faces, text, advertisements, books, and other such image subject matter.

With the benefit of high speed image processing on the remote server and high bandwidth communication networks connecting the mobile device to the remote server, it is possible to share computing resources between the mobile and the server. By sharing resources, substantially immediate, seamless, and real-time tracking of an object's characteristics or location can be accomplished. For example, the use of server-side resources enables the recognition and tracking of objects that could otherwise be too computationally intensive and too space prohibitive to run solely on a mobile device. The sharing of computing resources between the remote server and the mobile device also allows for faster text processing among multiple text objects. Thus, for example, multiple text objects can be efficiently translated from and/or into multiple languages. Applications of the disclosed technology include video surveillance, robotics, travel, and other applications that rely, for example, on one or more of text translation, object recognition, or facial recognition.

The foregoing and other objects, features, and advantages of the disclosed technology will become more apparent from the following detailed description, which proceeds with reference to the accompanying figures.

BRIEF DESCRIPTION OF THE DRAWINGS

FIG. 5 further indicates computing tasks that are implemented on a client mobile device and computing tasks that are implemented on a remote server.

FIG. 6 further indicates computing tasks that are implemented on the client mobile device and computing tasks that are implemented on the remote server.

FIG. 7 further indicates computing tasks that are implemented on the client mobile device and computing tasks that are implemented on the remote server.

FIG. 8 further indicates computing tasks that are implemented on the client mobile device and steps that are implemented on the remote server.

FIG. 9 further indicates computing tasks that are implemented on the client mobile device and steps that are implemented on the remote server.

FIG. 10 further indicates computing tasks that are implemented on the client mobile device and computing tasks that are implemented on the remote server.

FIG. 11 further indicates computing tasks that are implemented on the client mobile device and computing tasks that are implemented on the remote server.

DETAILED DESCRIPTION

I. General Considerations

Disclosed below are representative embodiments of methods, apparatus, and systems for performing server-assisted visual recognition and tracking. The disclosed methods, apparatus, and systems should not be construed as limiting in any way. Instead, the present disclosure is directed toward all novel and nonobvious features and aspects of the various disclosed embodiments, alone and in various combinations and sub-combinations with one another. Furthermore, any features or aspects of the disclosed embodiments can be used alone or in various combinations and sub-combinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Furthermore, as used herein, the term "and/or" means any one item or combination of items in the phrase.

II. Example Computing Environments

Figure 1:
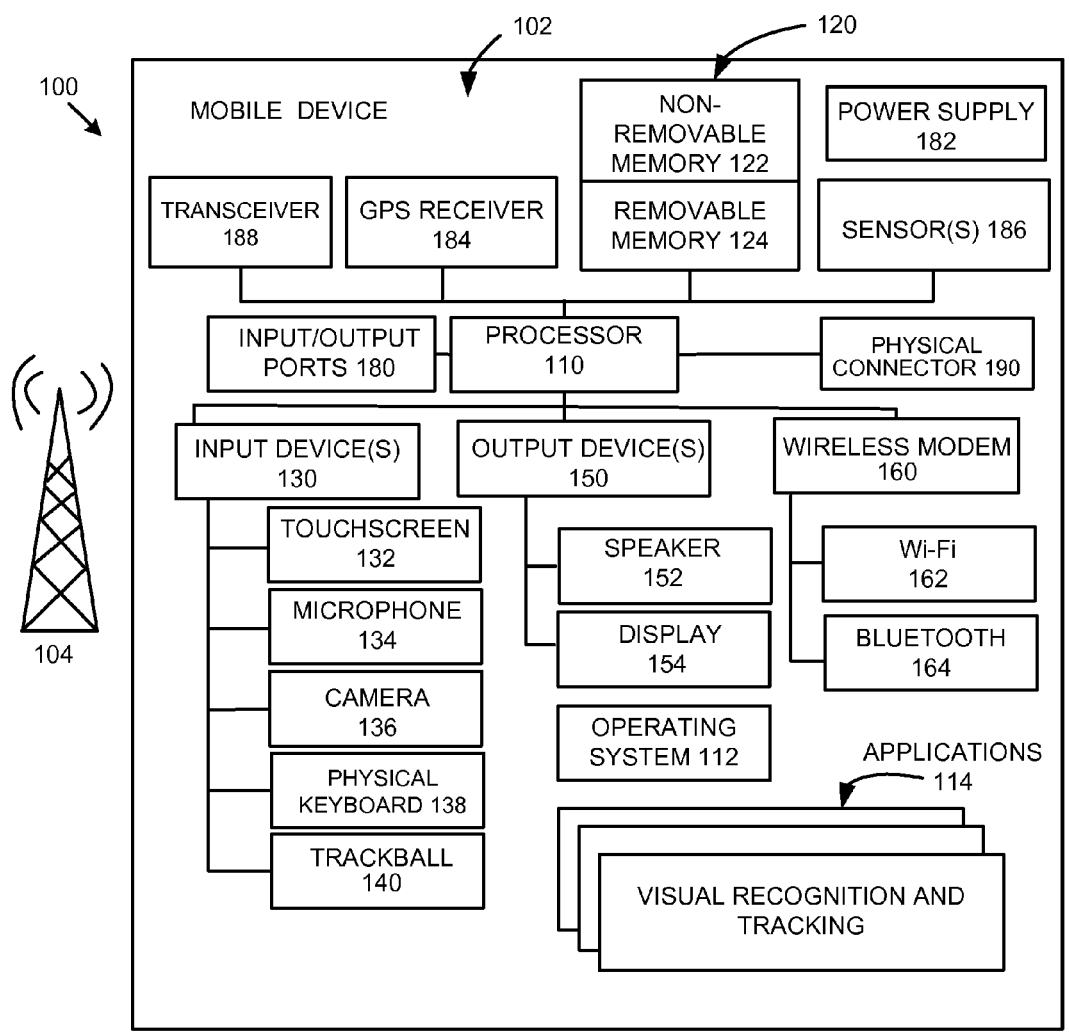
FIG. 1 is a block diagram illustrating an example mobile computing device which can be configured to implement embodiments of the disclosed technology.

FIG. 1 is a schematic block diagram of an exemplary mobile computing device (100) capable of implementing embodiments of the techniques described herein. The mobile device (100) includes a variety of optional hardware and software components, shown generally at (102). In general, a component (102) in the mobile device can communicate with any other component of the device, although not all connections are shown for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, or the like) and can allow wireless two-way communications with one or more mobile communications networks (104), such as a Wi-Fi, cellular, or satellite network.

The illustrated mobile device (100) includes a controller or processor (110) (e.g., a signal processor, microprocessor, ASIC, or other control and processing logic circuitry) for performing such tasks as signal coding, data processing, input/output processing, power control, and/or other functions. An operating system (112) controls the allocation and usage of the components (102) and support for one or more application programs (114), such as a visual recognition and tracking application that implements one or more of the innovative features described herein. In addition to visual recognition and tracking software, the application programs can include common mobile computing applications (e.g., telephony applications, email applications, calendars, contact managers, web browsers, messaging applications) or any other computing application.

The illustrated mobile device (100) includes memory (120). Memory (120) can include non-removable memory (122) and/or removable memory (124). The non-removable memory (122) can include RAM, ROM, flash memory, a hard disk, or other well-known memory storage technologies. The removable memory (124) can include flash memory or a Subscriber Identity Module (SIM) card, which is well known in Global System for Mobile Communications (GSM) communication systems, or other well-known memory storage technologies, such as "smart cards." The memory (120) can be used for storing data and/or code for running the operating system (112) and the applications (114). Example data can include web pages, text, images, sound files, image data, video data, or other data sets to be sent to and/or received from one or more network servers or other devices via one or more wired or wireless networks. The memory (120) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (100) can support one or more input devices (130), such as a touchscreen (132) (e.g., capable of capturing finger tap inputs, finger gesture inputs, multi-finger tap inputs, multi-finger gesture inputs, or keystroke inputs from a virtual keyboard or keypad), microphone (134) (e.g., capable of capturing voice input), camera (136) (e.g., capable of capturing still picture images and/or video images), physical keyboard (138), buttons and/or trackball (140) and one or more output devices (150), such as a speaker (152) and a display (154). Other possible output devices (not shown) can include piezoelectric or other haptic output devices. Some devices can serve more than one input/output function. For example, touchscreen (132) and display (154) can be combined into a single input/output device.

A wireless modem (160) can be coupled to one or more antennas (not shown) and can support two-way communications between the processor (110) and external devices, as is well understood in the art. The modem (160) is shown generically and can include, for example, a cellular modem for communicating at long range with the mobile communication network (104), a Bluetooth-compatible modem (164), or a Wi-Fi-compatible modem (162) for communicating at short range with an external Bluetooth-equipped device or a local wireless data network or router. The wireless modem (160) is typically configured for communication with one or more cellular networks, such as a GSM network for data and voice communications within a single cellular network, between cellular networks, or between the mobile device and a public switched telephone network (PSTN).

The mobile device can further include at least one input/output port (180), a power supply (182), a satellite navigation system receiver (184), such as a Global Positioning System (GPS) receiver, sensors (186), such as, for example, an accelerometer, a gyroscope, a compass, or an infrared proximity sensor for detecting the orientation or motion of the device (100), a transceiver (188) (for wirelessly transmitting analog or digital signals) and/or a physical connector (190), which can be a USB port, IEEE 1394 (FireWire) port, and/or RS-232 port. The illustrated components (102) are not required or all-inclusive, as any of the components shown can be deleted and other components can be added.

The mobile device can determine location data that indicates the location of the mobile device based upon information received through the satellite navigation system receiver (184) (e.g., GPS receiver). Alternatively, the mobile device can determine location data that indicates the location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to a map navigation tool for use in map navigation. For example, the map navigation tool periodically requests, or polls for, current location data through an interface exposed by the operating system (112) (which in turn can get updated location data from another component of the mobile device), or the operating system (112) pushes updated location data through a callback mechanism to any application (such as the visual recognition and tracking application described herein) that has registered for such updates.

With the visual recognition and tracking application and/or other software or hardware components, the mobile device (100) can implement the technologies described herein. For example, the processor (110) can update a scene and/or list, view, or track objects in real time. As a client computing device, the mobile device (100) can send requests to a server computing device, and receive images, object data, or other data in return from the server computing device.

Although FIG. 1 illustrates a mobile device in the form of a smartphone (100), more generally, the techniques and solutions described herein can be implemented with connected devices having other screen capabilities and device form factors, such as a tablet computer, a virtual reality device connected to a mobile or desktop computer, an image sensor attached to a gaming console or television, and the like. Computing services (e.g., remote server computation) can be provided locally or through a central service provider or a service provider connected via a network, such as the Internet and/or a wireless network. Thus, the visual recognition and tracking techniques described herein can be implemented on a connected device such as a client computing device. Similarly, any of various centralized computing devices or service providers can perform the role of a server computing device and deliver the recognition or tracking data to the connected devices.

Figure 2:
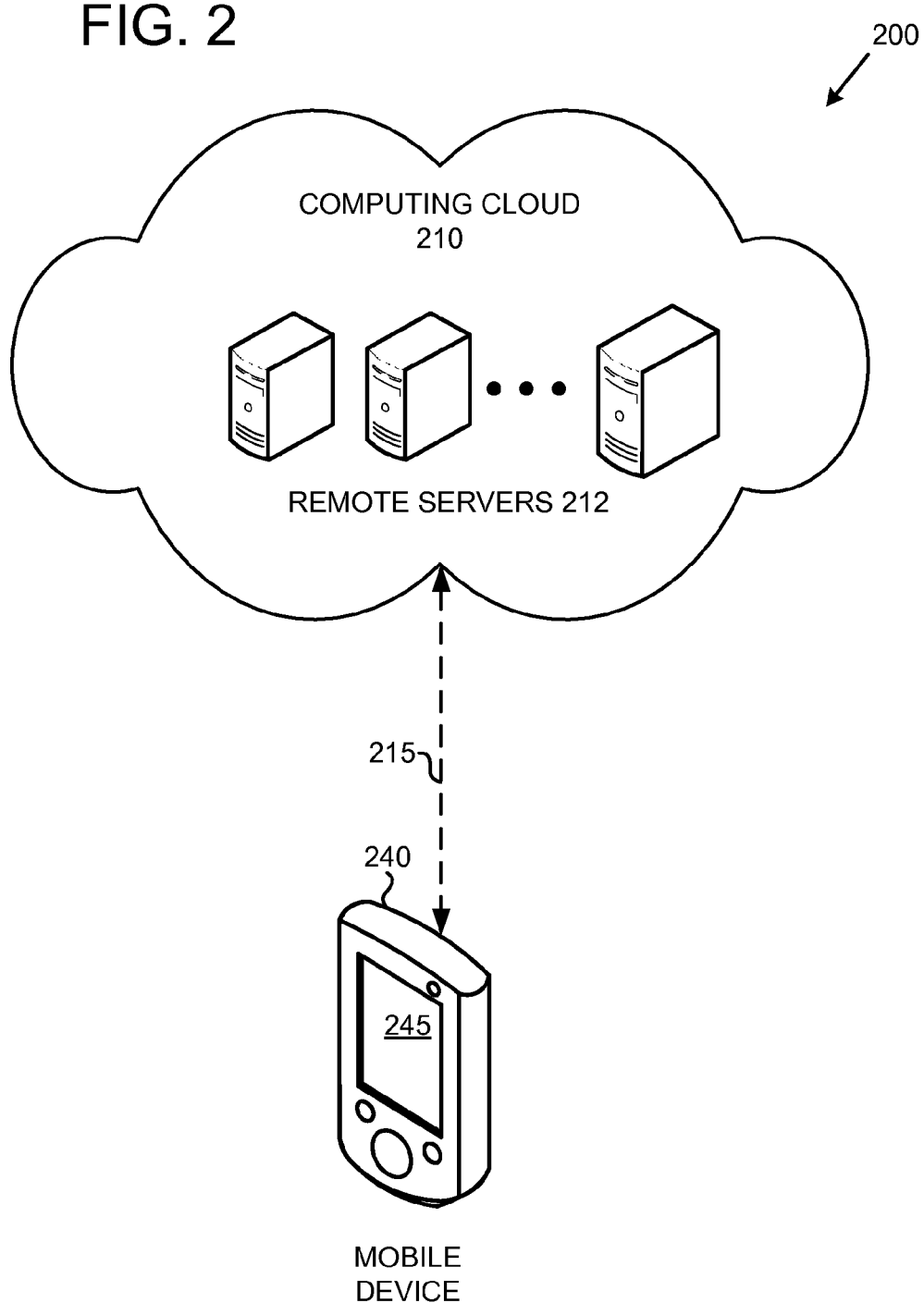
FIG. 2 is a system diagram showing a mobile device and a server connected via a network and which can be configured to implement embodiments of the disclosed technology.

FIG. 2 illustrates a generalized example of a suitable implementation environment (200) in which described embodiments of the disclosed technology can be implemented. In example environment (200), various types of services (e.g., computing services, such as the computing tasks described below and performed as part of visual recognition and tracking) are provided by a computing cloud (210). For example, the computing cloud (210) can comprise a collection of one or more computing devices (e.g., one or more servers, such as remote servers (212)), which can be located centrally or distributed and which provide cloud-based services to various types of users and devices connected via a network (215), such as the Internet and/or a high-speed wireless network (e.g., a 3G, 4G, or more advanced network). For ease of discussion, the computing devices in the computing cloud 210 are sometimes referred to herein as "servers" or "remote servers." Further, it should be understood that any other form of client-server network can be used to implement the disclosed technology instead of the illustrated cloud computing configuration.

The implementation environment (200) can be used in different ways to accomplish computing tasks. For example, some tasks (e.g., processing image data input from the camera and rendering a viewfinder image showing the image currently captured by the camera) can be performed on a connected mobile devices (240), while other tasks (e.g., computationally-intensive operations or storage of data to be used in subsequent processing) can be performed by computing devices within the computing cloud (210).

In the example environment (200), the servers (212) provide services for the connected device (240). The mobile device (240) typically has limited processing, battery, and storage capacity, and a small size screen (245). For example, the mobile device (240) could be a mobile phone, smartphone, personal digital assistant, tablet computer, or similar device. By contrast, the computing devices in the computing cloud (210) typically have substantial processing, power supply, and storage capacity.

The use of remote server ("server-side") resources (212) for the recognition and tracking applications described herein depends on the ability of the network (215) to provide high-bandwidth communications and on the ability of the processor of the one or more remote servers (212) to handle computationally-intensive and storage-intensive tasks, thereby allowing the real-time (or substantially real-time) recognition and tracking of objects such that the user experience is relatively smooth and seamless. In certain implementations, computationally-intensive tasks may be accomplished using high performance parallel computing resources on the server side. To the extent that computing and storage resources associated with the remote server(s) can be utilized efficiently, the mobile device resources can then be reserved for local tasks. Further, the use of the remote server to perform computationally intensive tasks can preserve the battery of the mobile device.

Figure 3:
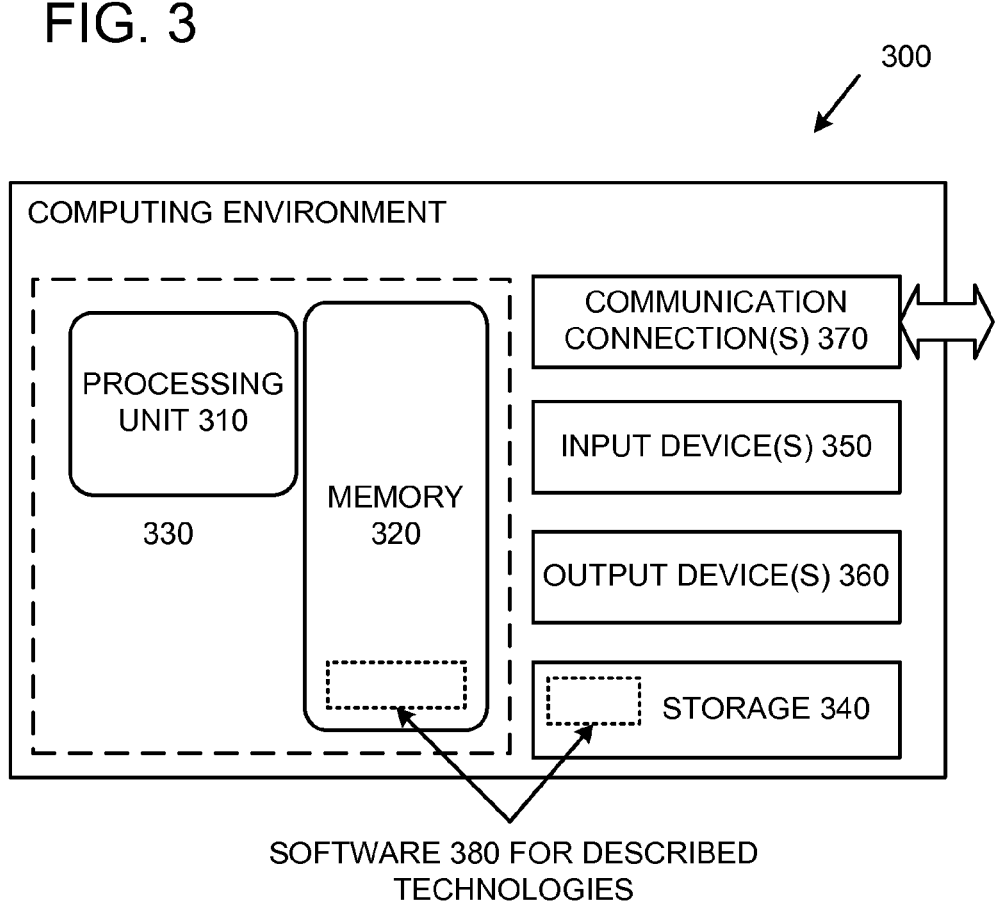
FIG. 3 is a block diagram of a generalized computing environment suitable for implementing embodiments of the disclosed techniques and technologies.

FIG. 3 illustrates a generalized example of a suitable computing environment (300) for implementing the computing resources in the computing cloud 210 (e.g., for the implementing the servers 212). With reference to FIG. 3, the computing environment (300) includes at least one central processing unit (310) and memory (320). In FIG. 3, this most basic configuration (330) is included within a dashed line. The central processing unit (310) executes computer-executable instructions and may be a real or a virtual processor. In a multi-processing system, multiple processing units execute computer-executable instructions to increase processing power and as such, multiple processors can be running simultaneously. The memory (320) may be volatile memory (e.g., registers, cache, RAM), non-volatile memory (e.g., ROM, EEPROM, flash memory, etc.), or some combination of the two. The memory (320) stores software (380) that can, for example, implement the technologies described herein. A computing environment may have additional features. For example, the computing environment (300) includes storage (340), one or more input devices (350), one or more output devices (360), one or more communication connections (370), and one or more touchscreens (390). An interconnection mechanism (not shown) such as a bus, a controller, or a network, interconnects the components of the computing environment (300). Typically, operating system software (not shown) provides an operating environment for other software executing in the computing environment (300), and coordinates activities of the components of the computing environment (300).

The storage (340) may be removable or non-removable, and includes magnetic disks, magnetic tapes or cassettes, CD-ROMs, CD-RWs, DVDs, or any other non-transitory storage medium which can be used to store information and that can be accessed within the computing environment (300). The storage (340) stores instructions for the software (380), which can implement technologies described herein.

The input device(s) (350) may be a touch input device, such as a touchscreen, keyboard, keypad, mouse, pen, or trackball, a voice input device, a scanning device, or another device, that provides input to the computing environment (300). The output device(s) (360) may be a display, touchscreen, printer, speaker, CD-writer, or another device that provides output from the computing environment (300).

The communication connection(s) (370) enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment (300). By way of example, and not limitation, with the computing environment (300), computer-readable media include memory (320) and/or storage (340). As should be readily understood, the term computer-readable storage media includes non-transitory storage media for data storage such as memory (320) and storage (340), and not transmission media such as modulated data signals.

III. Exemplary Server-Assisted Visual Recognition and Tracking Systems

Figure 4:
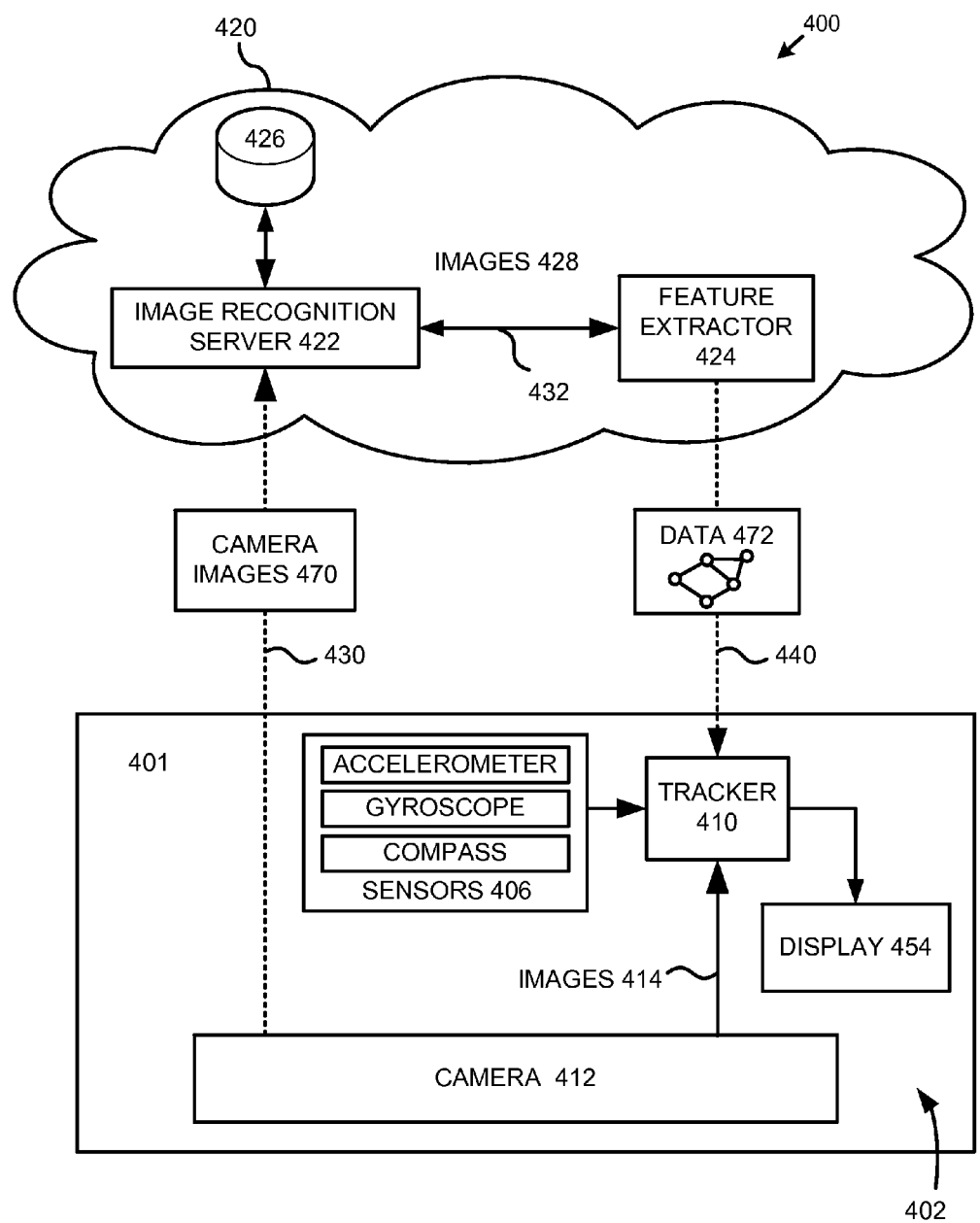
FIG. 4 is a block diagram illustrating an example software architecture for a visual tracking application.

FIG. 4 shows components of an exemplary visual recognition and tracking system (400) comprising a mobile device (401) (e.g., a mobile device such as the mobile device (100)), a remote computing environment (420), and communication links (430) and (440) that are desirably wireless. The remote computing environment (420) can comprise, for example, one or more servers in a client-server network or in a computing cloud (e.g., cloud (210)). The wireless communication links (430) and (440) can be supported by a wireless transceiver of the mobile device, such as wireless transceiver (104).

Components (402) within the mobile device (401) that have particular relevance to the exemplary visual recognition and tracking system (400) include one or more sensors (406), a tracking component (410), a camera (412), and a display (454). The tracking component (410) is sometimes referred to as the "tracker" and can be implemented by software or by dedicated hardware. The display (454) can be a touchscreen display as described above.

Components within the remote computing environment (420) include an image recognition component (422), a feature extractor (424), a feature database (426), and a communications link (432) that supports the transfer of image data (428) (e.g., a high-resolution image). The image recognition component (422) and the feature extractor (424) can be implemented as software components or by dedicated hardware.

In general, the image recognition component (422) and the feature extractor (424) are configured to identify known objects or entities that are observed in a viewfinder image of the camera (412) on the mobile device (401). Once identified, data indicating the identity of the object (optionally with additional information about the object) and/or data for a reference frame bounding the object in the image can be generated (e.g., a "bounding box," a jagged outline region, an alpha mask, or the like). In the illustrated embodiment, the system (400) is further configured to track movements of those objects (e.g., in real time or substantially real time). As more fully explained below, the tracking can be performed by the mobile device (401) or can be performed, at least in part, by the computing resources in the remote computing environment (420).

In particular embodiments, the camera (412) is configured to capture digital images (470) and to send one or more digital images or selected portions thereof (470) to the remote computing environment (420) via the communication link (430) for analysis (e.g., object recognition/or and tracking). The captured images or image portions that are sent can be photos taken by the user (e.g., captured upon the user depressing a shutter button) or images captured by the camera as the user orients the mobile device toward a subject with the camera enabled such that a scene or viewfinder image is visible on the screen. In the latter case, images can be continuously captured by the camera and displayed, with selected images being periodically transmitted to the remote computing environment (420). In particular embodiments, a user can point the mobile device in the direction of a scene, and select a portion of the image that is of particular interest by highlighting a portion of the scene in the viewfinder, for example, by manipulating a bounding rectangle or by tapping the portion of the scene of interest. In other embodiments, the entire image is sent to the remote computing environment (420). In still other embodiments, the mobile device selects one or more image portions to send without input from the user (e.g., using a suitable feature recognition technique (e.g., based on edge detection, luminance and/or chrominance contrast, repeating patterns, and the like)). Objects or entities suitable for detection and tracking include, but are not limited to, people, animals, faces, vehicles, landscape elements, buildings, text objects, or any other objects that have distinguishing shapes, movements, colors, or other characteristics and can be recognized.

In response to a service call from the mobile device (401), the remote computing environment (420) is configured to recognize objects in the received images (470) or image portions. For example, the remote computing environment (420) can use the image recognition component (422) (e.g., an image recognition server that accesses an image or feature database (426) and the feature extractor (424) (e.g., a feature extraction application running on the image recognition server). Together, the image recognition component (422) and the feature extractor (424) implement detailed object recognition (e.g., object recognition that has finer resolution and better feature extraction capabilities than those available on the mobile device). The image recognition component (422) and the feature extractor (424) can use any of a variety of object recognition techniques, such as, for example, objection recognition techniques based on one or more of edge detection, interest point detection, corner detection, blob detection, greyscale matching, gradient matching, matching to object templates, or any other object detection technique. In the illustrated embodiment, the feature extractor (424) is configured to extract features (e.g., edges, corners, blobs, or other such features modeling the shape of the object) from images (428) (e.g., the images (470) or a high-resolution image stored in the database (426) and matched to the images (470)) and to return object data (472) about the extracted features via a communication link (440) to the mobile device (401). The images (428) can be obtained directly from the mobile device or can be high-resolution images generated from lower-resolution images supplied by the mobile device (401) or generated from comparing a lower-resolution image to a library of high-resolution images and selecting the best match. The object data (472) can include, for example, one or more additional images of an object recognized in the one or more images (470) (e.g., a high-resolution image or other image from an image database), visual features of the recognized object (e.g., a model of the object produced by the feature extractor and comprising edge data, corner data, and/or blob data), decoded or translated text, and/or look-up information associated with identified objects. For example, if the image analysis identifies an object of interest as a landmark (e.g., the statue of liberty), information about the statue, such as its size, materials, history, significance, location, latitude and longitude, maps, hours of operation, telephone contact information, and the like, may be returned for display on the mobile device display (454) along with a higher-resolution image of the landmark. The object data (472) can also include "reference frame" data, or "tracking points," comprising data indicating the location of the object within the viewfinder image to facilitate subsequently tracking the object. The reference frame data can comprise data for generating a reference frame (e.g., a "bounding box," a jagged outline region, an alpha mask, or the like) around the recognized object. The reference frame can then be displayed as an overlay of the image on the display (454), thereby highlighting the object for the user.

The tracker (410) can be configured to monitor the recognized objects at successive time intervals and match objects of an older viewfinder frame to those of a current viewfinder frame. The tracking can be performed, at least in part, by comparing the object data (including, for example, the reference frame data for the object) received from the server 420 for two or more viewfinder image frames. The tracker (410) can also be configured to use additional inputs to track the objects, such as additional viewfinder images (414) supplied by the camera (412) or sensor data supplied by sensors (406) (e.g., one or more accelerometers, gyroscopes, or compasses for determining the orientation or location of the mobile device (401)). For example, in certain embodiments, the system (400) operates such that the viewfinder images from the camera (412) are only periodically sent to the remote computing environment (420) (e.g., every x images captured by the camera, where x is any value (such as between 2-100)). For the viewfinder images that are captured in between the images sent to the remote computing environment (420), the tracker (410) can operate to track movement of the one or more recognized objects in the images. Tracking can be performed using any of a variety of techniques. For example, one or more of a block tracking, kernel-based tracking, contour tracking, tracking using a Kalman filter, tracking using a particle filter, or any other tracking technique can be used.

In particular implementations, the object reference frames can be displayed on the mobile device display (454). Although it may be advantageous to perform tracking after object data (472) is received from the remote server (420), tracking can also begin prior to receipt of the data (472). Furthermore, using embodiments of the disclosed system (400) and with appropriate coordination of computing resources, multiple objects can be tracked simultaneously and automatically. Additionally, in certain embodiments, the objects are tracked in the background, without the user's knowledge or without displaying the results to the user. In such embodiments, the results can be shown to the user at any point in the process.

IV. Exemplary Embodiments for Performing Server-Assisted Object Recognition and Tracking FIGS. 5-11 are flow diagrams of exemplary embodiments of a visual recognition and tracking method, wherein a modified distribution of computing tasks is shown for each different implementation. In FIGS. 5-11, client-side mobile device processing tasks are shown on the left side of the figures, whereas server-side processing tasks are shown on the right side of the figures.

Figure 5:
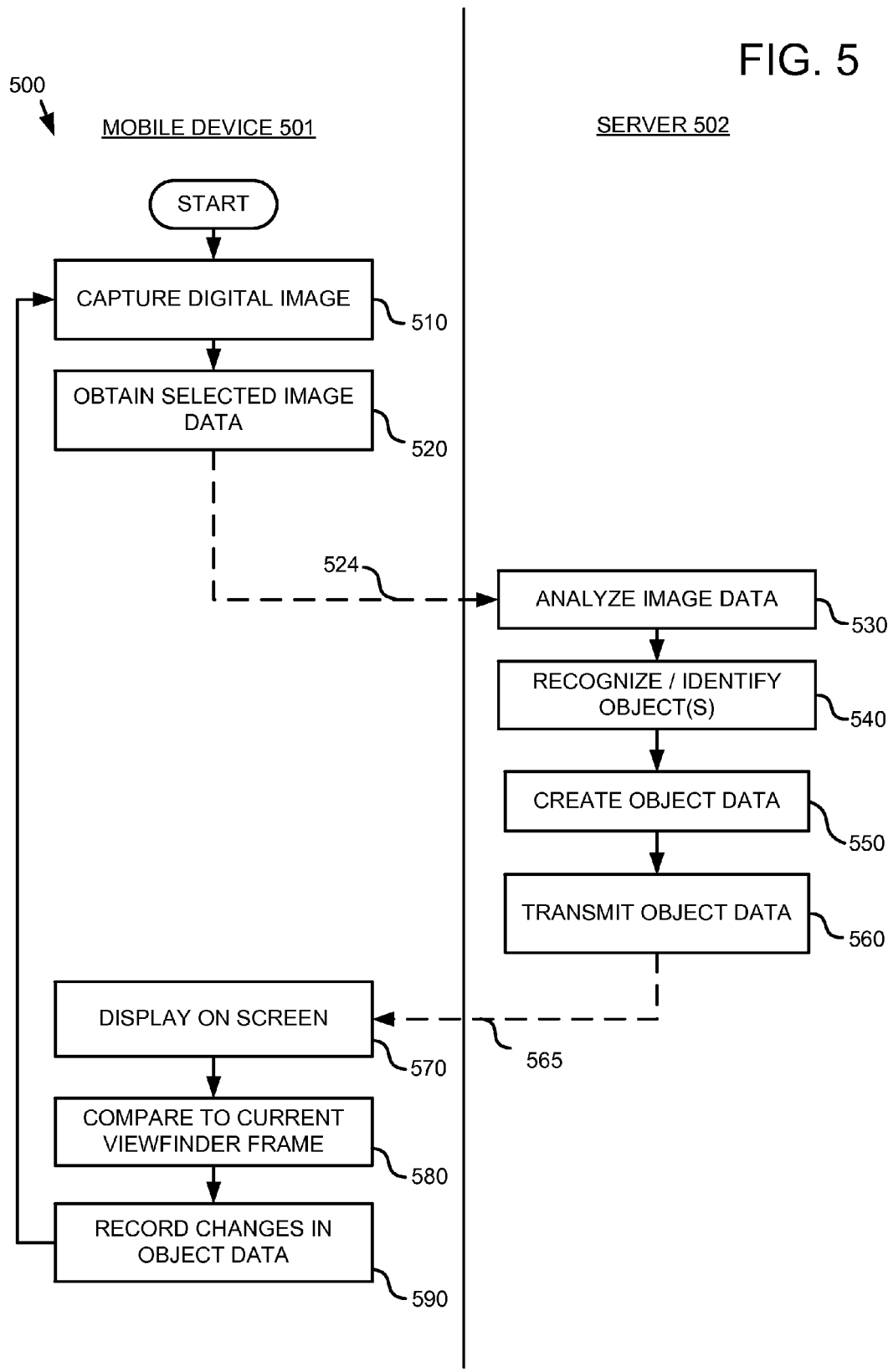
FIG. 5 is a flow diagram showing an exemplary implementation of a visual tracking method.

With reference to FIG. 5, in one exemplary implementation (500), the server-side processing tasks (530-560) are completed before tracking takes place on the mobile device (570-590). In this case, the mobile device (501) is configured to capture a digital image (510) and select image data (520) for analysis. The mobile device (501) can then place a service call (524) to the remote server (502), where the selected image data is transmitted to the remote server for analysis (530) and object recognition (540). The selected image data provided as input to the remote server can be for the current frame in the viewfinder. Furthermore, the image data can be for a partial or a full viewfinder frame, with a range of resolution options. When the image recognition server (502) recognizes an object, object data can be created (550) and returned as a recognition result (560, 565) by the remote server (502) to the mobile device (501) for display on the mobile device screen. The mobile device (501) can be configured to track the object of interest by comparing the object data to subsequent frames of viewfinder image data (580) (e.g., a current viewfinder image) and recording the changes in the object data (590). Alternatively, in other implementations, certain steps shown in FIG. 5 on the server side can be partly accomplished as client-side tasks; likewise, other tasks shown in FIG. 5 on the client side can be partly accomplished on the server side.

Figure 6:
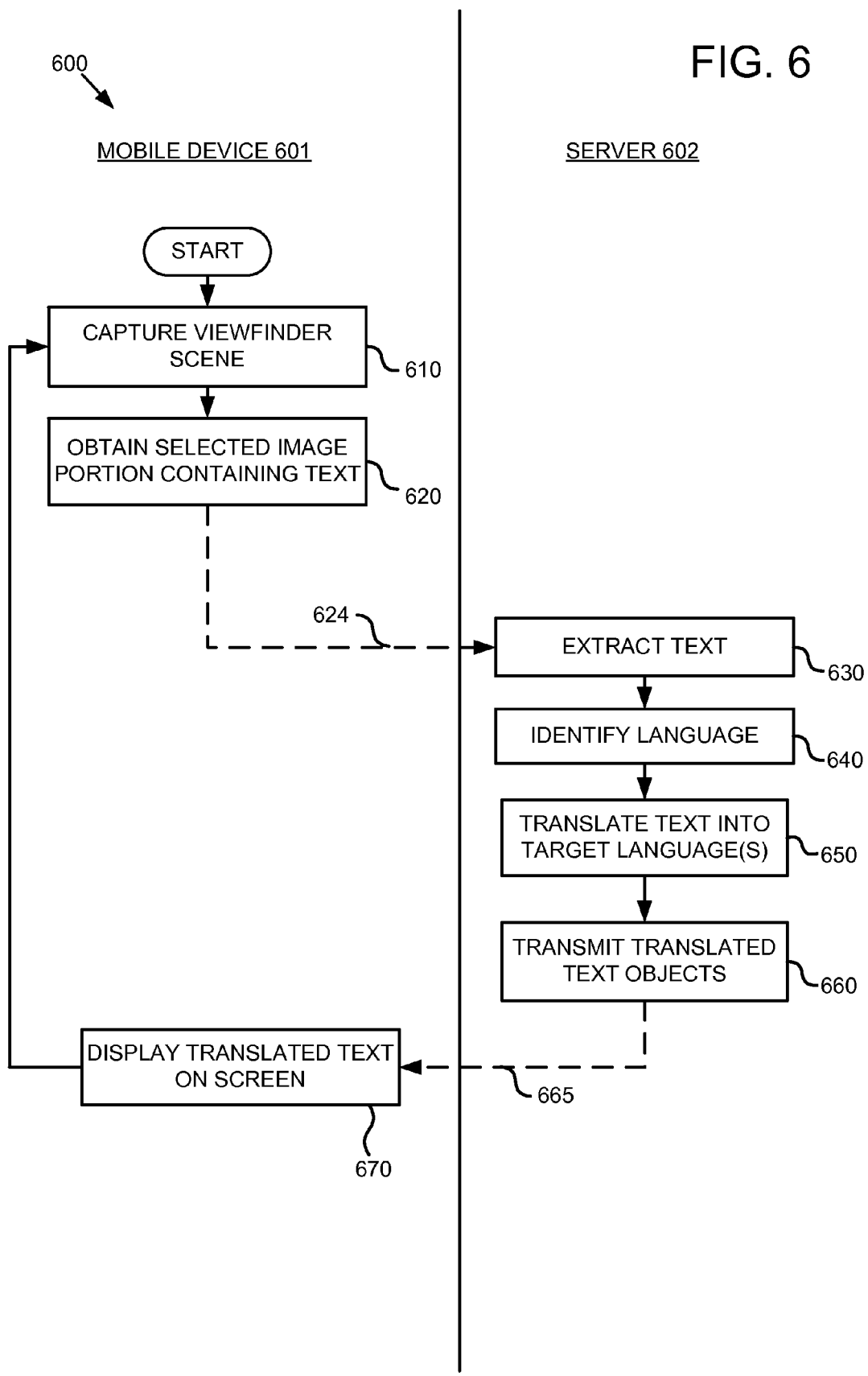
FIG. 6 is a flow diagram showing an exemplary implementation of a text-based visual tracking method.

FIG. 6 illustrates an exemplary method (600) for performing text translation according to an embodiment of the disclosed technology. In FIG. 6, the image recognition server (602) is configured to recognize foreign language text within a scene in the camera viewfinder for translation into one or more target languages that can be selected by the mobile device user. In this case, client-side tasks begin with capturing a viewfinder scene (610) as a digital image and selecting an image portion that includes the text of interest (620). A service call is made (624) to the remote server (602) to initiate server-side tasks. The server-side tasks include, for example, extracting one or more text objects (630) (e.g., using a suitable optical character recognition (OCR) technique)), identifying the text language based on the OCR results (e.g., Italian, Russian, Chinese, and the like) (640), and translating the text into the user's desired language(s) (650) (e.g., using any of a variety of available language translation applications). Data for the translated text (e.g., data representing the content of the translated text and/or for displaying the translated text in place of the original text) can then be returned (660, 665) to the mobile device (601) for display on the mobile device screen (670) in the user's native language. For situations in which a user is located in a foreign country where both the language and the alphabet are unfamiliar (e.g., an American traveling in China), such an automatic text translator can be an invaluable travel tool. In this implementation, the use of server-side computing resources can allow for the recognition and translation of text objects to occur rapidly and accurately. Further, because the server-side computing resources can be substantial, multiple text objects can be recognized.

Figure 7:
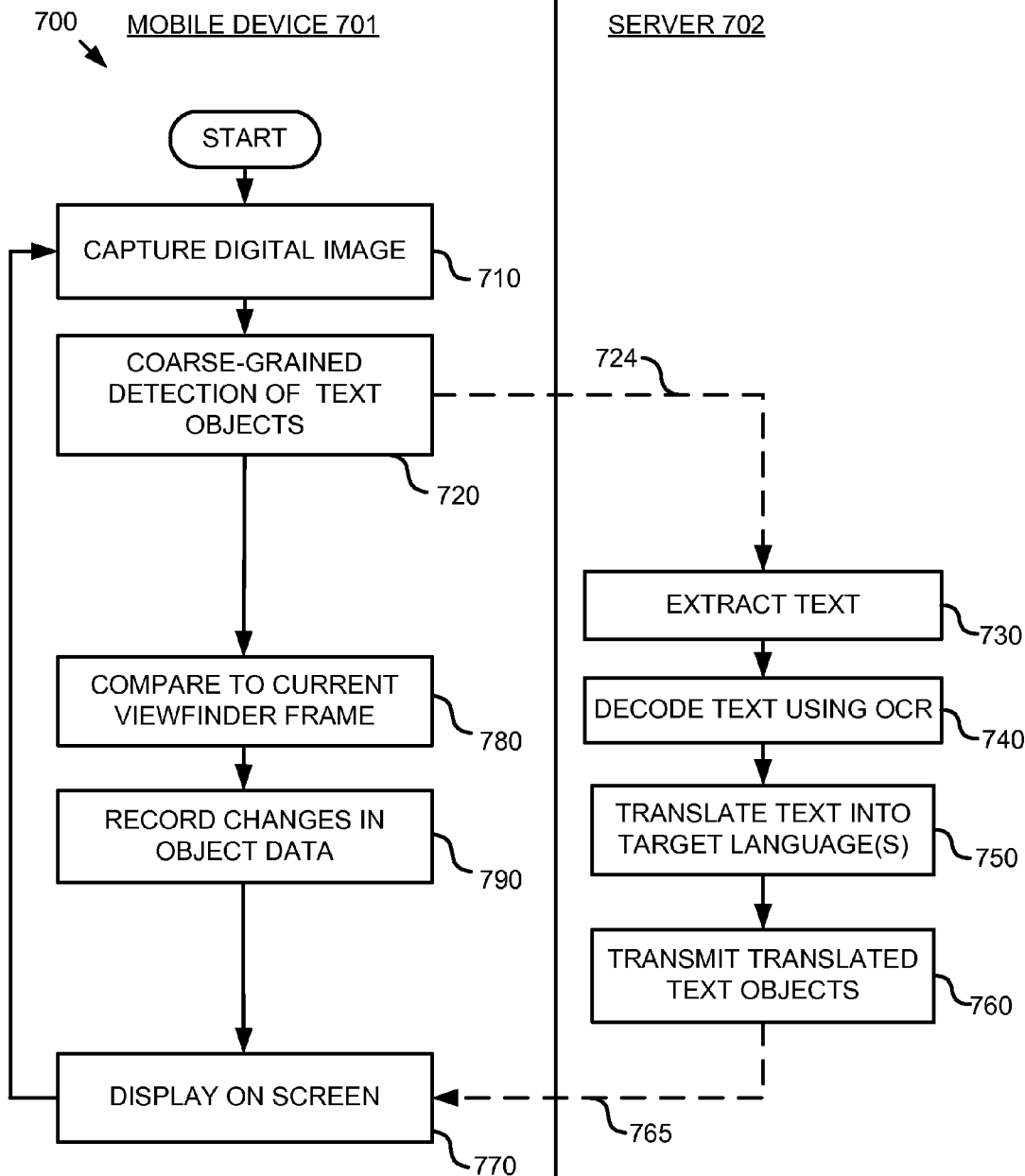
FIG. 7 is a flow diagram showing an exemplary implementation of a visual tracking method that uses preliminary object detection.

FIG. 7 illustrates an exemplary method in which preliminary object detection (700) is implemented on the mobile device (701) so that initial tracking tasks commence on the client side prior to sending a service call to the remote server (702). In this case, a digital image is captured (710), and using coarse-grained detection of, for example, text objects (720), the mobile device (701) can quickly detect regions of the viewfinder frame image that appear to contain text, or regions that have characteristics of words (e.g., by using edge detection techniques and/or simple optical character recognition (OCR) techniques). In general, coarse-grained detection comprises detection that has lower resolution and/or is less computationally intensive than the object recognition performed by the server. The mobile device can also begin tracking the locations of the text in real time. In the illustrated embodiment, a server request (724) to decode and translate the text is made in parallel. The decoding of the text can be performed using optical character recognition techniques (OCR). Furthermore, the OCR that is applied by the server can be programmed to recognize multiple languages. Once the words are fully recognized and decoded, results can be translated into multiple languages on the server side (750) in parallel with tracking activities on the mobile device side (780, 790), and then transmitted as translated text objects (760, 765) for display on the screen of the mobile device (770). Use of preliminary detection by the mobile device accelerates the tracking process. Tracking can also be refined by server-side computation, for example, by supporting both word recognition and translation of a broad range of languages without restricting space on the mobile device. It should be noted that the embodiments described above with respect to FIGS. 6 and 7 are not limited to textual recognition, but can be adapted for any other type of object identification and tracking.

Figure 8:
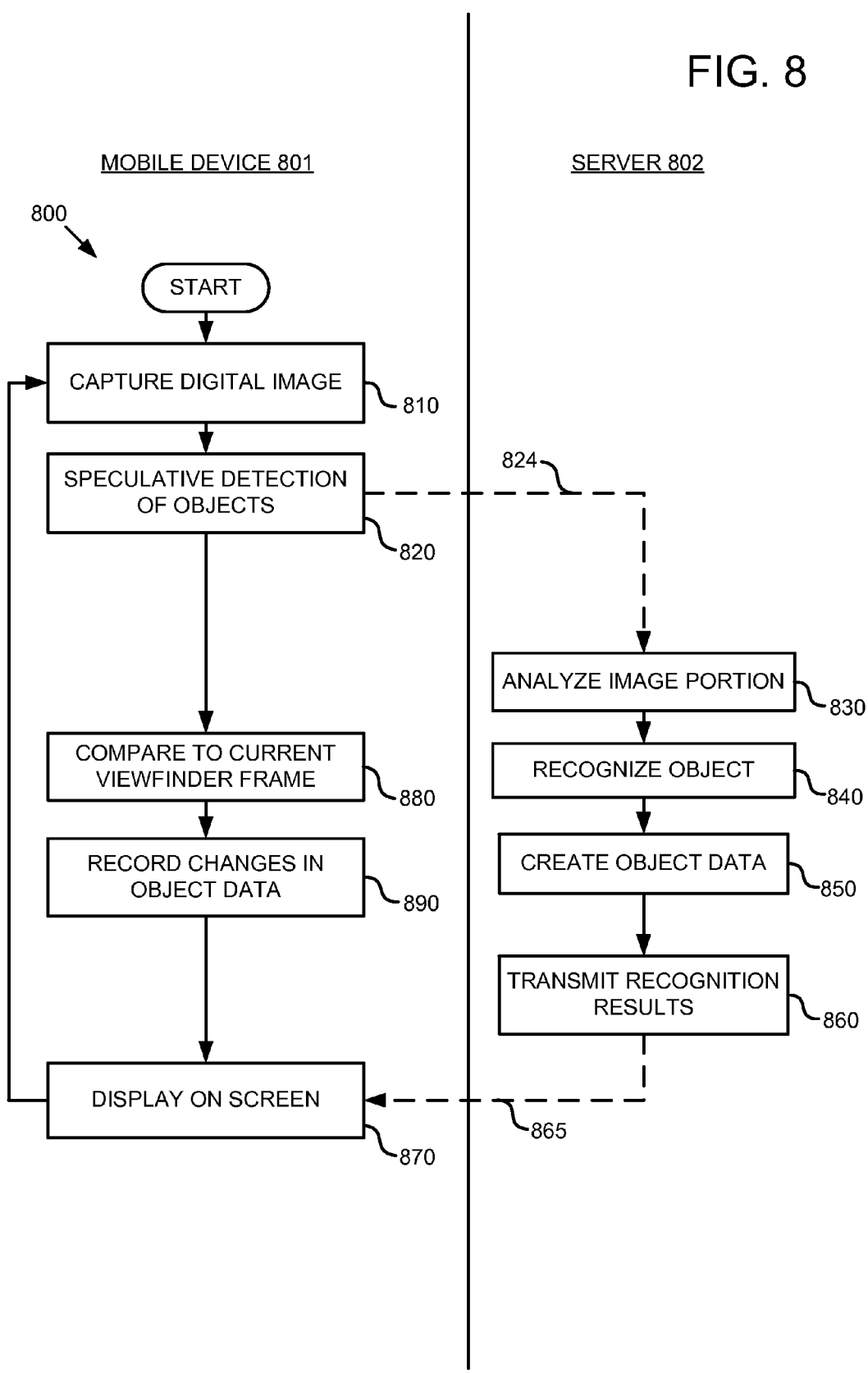
FIG. 8 is a flow diagram showing an exemplary implementation of a dynamic visual tracking method.

FIG. 8 illustrates an exemplary dynamic tracking method (800) in which the speculative detection of objects of interest is accomplished as client-side tasks (801) and then confirmed or refined by remote server-side tasks (802). For example, in the illustrated embodiment, after capturing a digital image (810), speculative detection of objects (820) can be performed. The speculative detection of objects can be performed using a variety of computationally efficient techniques that identify areas in the viewfinder image that exhibit certain criteria indicative of objects of interest. For example, the detection can be performed by identifying high/low contrast transitions, areas having a defined border, or areas that have a repetitive pattern. Once possible objects of interest are identified, display (870) and tracking (880, 890) can commence in the mobile device (801) while, in parallel, a service call is made (824) to the remote server (802) for confirmation and further refinement. The image data sent to the server can be for a partial or a full viewfinder frame, with a range of resolution options. This approach allows for objects of interest to be dynamically tracked (880, 890) and for details from recognition results (830-850) to be filled in when they are available and received after transmission from the server (860, 865). Dynamic tracking can involve multiple service calls to the remote server, and falsely recognized objects can be culled from subsequent viewfinder images. In this way, object data can become more highly detailed and refined with each iteration. During this process, false positives can be faded out from the mobile device display if the recognition component at the server (802) fails to confirm a region or object as a known entity.

Figure 9:
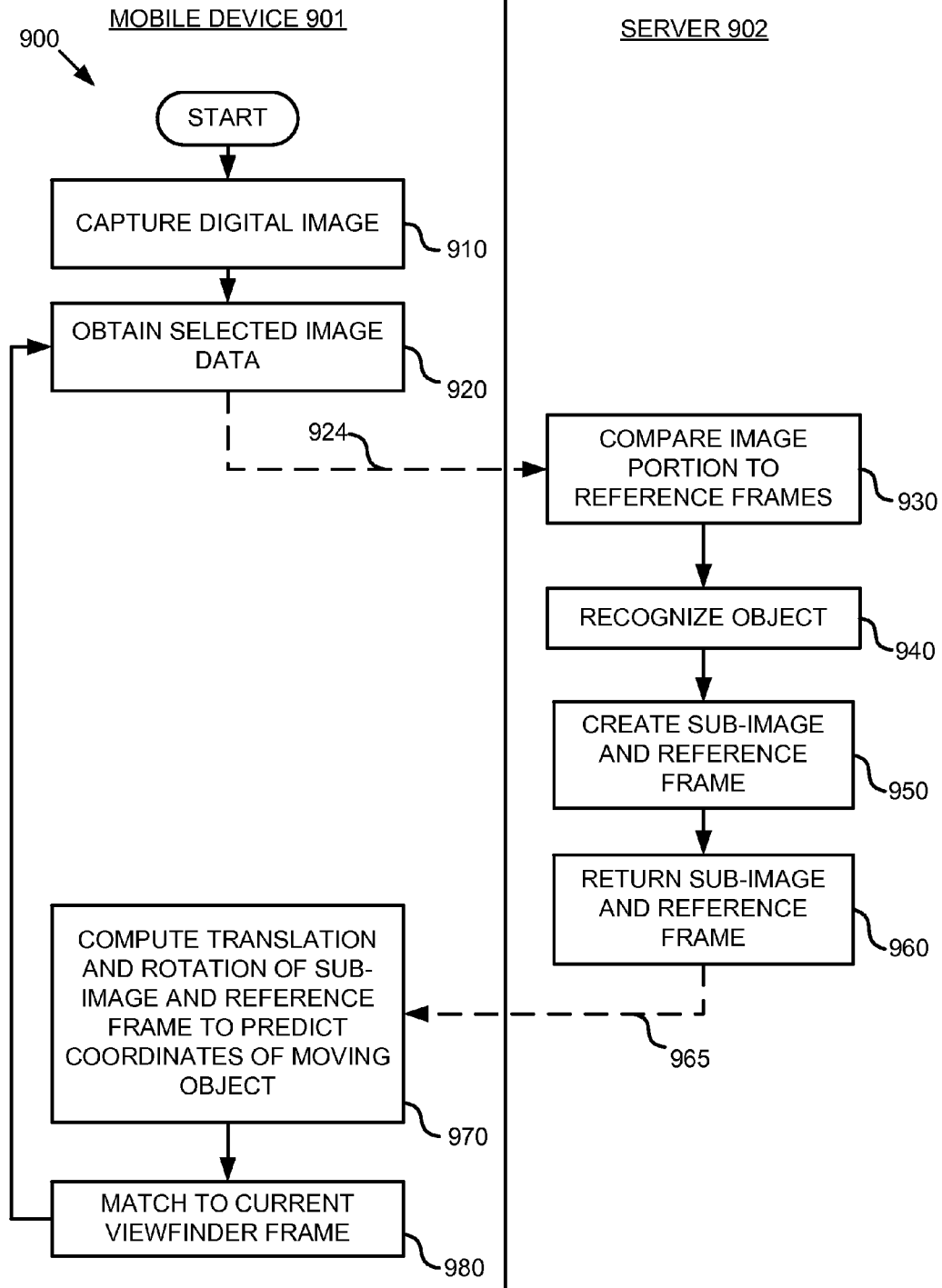
FIG. 9 is a flow diagram showing an exemplary implementation of a visual tracking method that involves image registration.
Figure 10:
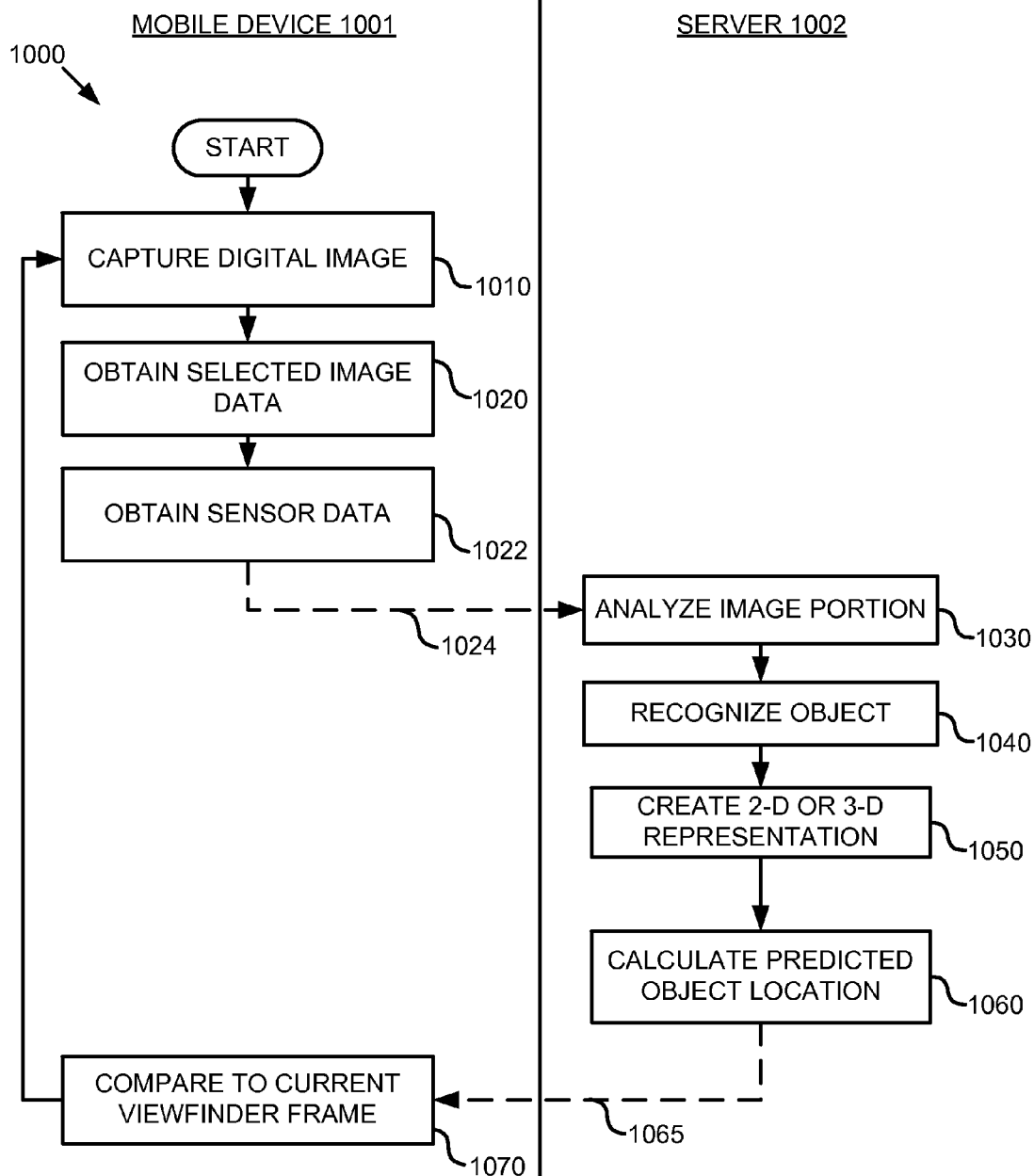
FIG. 10 is a flow diagram showing an exemplary implementation of a predictive approach to a visual tracking method.

As noted above in Section III, the object data sent from the server can include reference frame data, which identifies the location of the object within the analyzed viewfinder image. This reference data can be initially computed by the server and used to assist the tracking performed by the client. FIGS. 9-10 illustrate more detailed implementations illustrating how the server can provide information for initiating or refining the tracking being performed by the client.

FIG. 9 illustrates an exemplary image registration method (900) in which tracking is initiated by the server (902) and then further carried out within a set of client-side mobile device (901) tasks. In the illustrated embodiment, after capturing a digital image (910), the mobile device can obtain selected image data (920) and supply the selected image data (924) to the remote server (902) for object recognition (e.g., by comparing the selected image data to an existing set of registered images). Furthermore, the image data can be for a partial or a full viewfinder frame, with a range of resolution options. Once an object is recognized (940), a sub-image and reference frame are created (950). The sub-image can comprise, for example, parts of an image, such as tracking points that are of particular interest. In this embodiment, the sub-image and reference frame are returned (960) to the mobile device (901). The client mobile device (901) then attempts to match (980) the sub-image and the reference frame to a corresponding portion of the current viewfinder frame. For example, the client can compute translation and rotation data pertaining to the sub-image (970) to recognize the object at a new location and rotation in the current viewfinder frame. This approach can be useful for tracking objects moving with respect to the viewfinder frame while the viewfinder remains substantially stationary.

FIG. 10 illustrates an exemplary method (1000) in which the server uses sensor information from the client mobile device to predict a location of the object when the mobile device is in motion. According to this approach, the remote server assumes that objects visible through the viewfinder of the mobile device remain substantially stationary, and the client can then track subsequent movements of the mobile device user with respect to a stationary object. After capture of a digital image (1010), selected image data is obtained (1020) by the mobile client (1001) and transmitted to the remote server (1024). Furthermore, the image data can be for a partial or a full viewfinder frame, with a range of resolution options. In addition to providing a selected image portion, the mobile device can provide sensor data (1022) from sensors (e.g., accelerometer, gyroscope, compass data, or combinations thereof). The sensor data can include data from the time the image portion was obtained and/or can include data sensed after the image portion was obtained (indicating movement of the mobile device after the image was captured). In this embodiment, the remote server (1002) is then configured to analyze the image portion (1030), recognize an object (1040), and create a multi-dimensional representation (1050), such as a reference frame, or other 2-D or 3-D representation, of the recognized object for use in the subsequent tracking (1070) by the mobile device (1001). The sensor data (1022) provides further information that the remote server (1002) can use to calculate a predicted location (1060) for the object. The location prediction and the multi-dimensional representation can then be transmitted (1065) to the client. Alternatively, the client mobile device can record sensor data from the time of the query to the server and perform tracking calculations for the multi-dimensional object representation once it is received from the server.

In certain embodiments, a combined approach that uses both the image registration approach (900) and the predictive approach (1000) is used. In such embodiments, the techniques are used together to provide a more seamless and fluid tracking experience.

Figure 11:
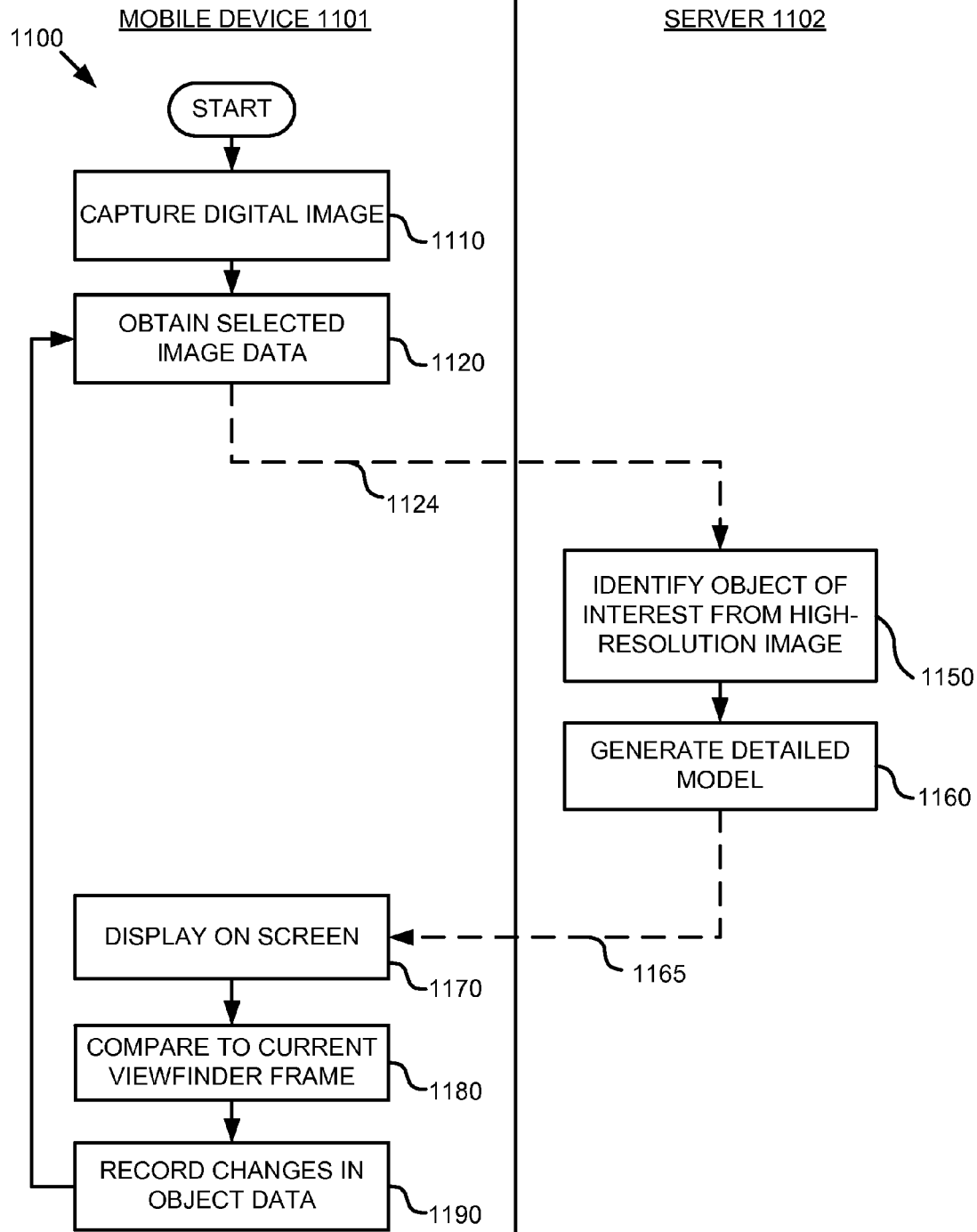
FIG. 11 is a flow diagram showing an exemplary implementation of a modeling approach to a visual tracking method.

FIG. 11 illustrates yet another embodiment in which the remote server (1102) generates and returns to the client a detailed model of a recognized object. According to this approach, a digital image is captured (1110) by the client mobile device and selected low-resolution image data is obtained (1120) and provided (1124) to the remote server. The image data can be for a partial or a full viewfinder frame, with a range of resolution options. An object of interest can be detected (1150) and a detailed model of the object generated (1160) by the server (e.g., a list of all the features of the object, their relative orientation, and/or other detailed object data). In the illustrated embodiment, the detailed model is generated from a high-resolution image available to the server and identified as corresponding to the image or image portion sent by the client by matching it to the image data and/or by using other data sent from the mobile device (e.g., longitude and latitude information). The detailed model can then be transmitted to the client (1165). As illustrated, the detailed model can also be at least partially displayed (1170) and used for tracking (1180, 1190). The client mobile device (1101) can also use the detailed model to conserve processing resources. For example, the model can be used to allow the client mobile device to match features in the current viewfinder frame to a wider variety of features as indicated by the detailed model. Feature extraction on the mobile device can then be halted when a desired number of feature matches is achieved. This approach is particularly suitable for identifying two-dimensional or three-dimensional "human scale" objects such as people, animals, vehicles, landmarks, and the like.

Having described and illustrated the principles of the disclosed technology in the detailed description and accompanying drawings, it will be recognized that the various embodiments can be modified in arrangement and detail without departing from such principles. For example, any technologies described herein for capturing still photos can also be adapted for capturing video. Elements of embodiments shown in software may be implemented in hardware and vice versa.

In view of the many possible embodiments to which the principles of the disclosed invention may be applied, it should be recognized that the illustrated embodiments are only preferred examples of the disclosed technology and should not be taken as limiting the scope of the disclosed technology. Rather, the scope of the disclosed technology is defined by the following claims and their equivalents. We therefore claim all that comes within the scope and spirit of these claims and their equivalents.

We claim:

1. A method, comprising:
   capturing digital image data using a camera of a mobile device;
   performing preliminary object detection on at least a portion of the image data to recognize an object and generate preliminary object detection data for the recognized object;
   tracking the recognized object using the preliminary object detection data, while transmitting the at least a portion of the image data to a remote server for confirmation of the recognized object and refinement of the preliminary object detection data;
   receiving from the remote server object data for the recognized object in the transmitted image data, the object data including data for an object reference frame for rendering on a display of the mobile device; and
   refining tracking of the recognized object based on the received object data and the preliminary object detection data, wherein the tracking commences on the mobile device using the preliminary object detection data and continues after receiving the object data from the remote server using both the preliminary object detection data and the received object data.

2. The method of claim 1, further comprising repeating the acts of capturing, transmitting, receiving, and tracking.

3. The method of claim 1, wherein the preliminary object detection comprises a coarse-grained detection of text objects in the image data or a speculative detection of areas of interest in the image data.

4. The method of claim 1, further comprising refining the preliminary object detection based at least in part on the received object data.

5. The method of claim 4, wherein the refining the preliminary object detection involves at least one of:
   eliminating one or more objects recognized through the preliminary object detection; and
   receiving a translated text object associated with text in the preliminary object detection data.

6. The method of claim 1, further comprising:
   capturing one or more additional instances of digital image data using the camera; and
   tracking changes in a location of the recognized object in the one or more additional instances of digital image data, the tracking being performed based at least in part on the object data received from the remote server.

7. The method of claim 6, wherein the tracking further comprises updating the data for the object reference frame for the one or more additional instances of digital image data; and
   wherein the method further comprises displaying the one or more additional instances of digital image data on the display of the mobile electronic device together with the updated object reference frame for the recognized object.

8. The method of claim 1, wherein the transmitting and the receiving reduces a computational burden on the mobile device relative to performing object recognition only on the mobile device itself.

9. The method of claim 1, further comprising transmitting sensor data to the remote server in addition to the at least a portion of the image data.

10. The method of claim 9, wherein the sensor data further comprises one or more of data from an accelerometer associated with the mobile device, data from a compass associated with the mobile device, data from a gyroscope associated with the mobile device, or data associated with global positioning system coordinates for the mobile device.

11. The method of claim 9, wherein the object data comprises data predicting a location of the recognized object based at least in part on the transmitted sensor data.

12. One or more computer-readable storage media storing computer-executable instructions which when executed by a computing device cause the computing device to perform a method for processing image data, the stored instructions comprising:
   instructions to capture digital image data using a camera of a mobile device;
   instructions to perform preliminary object detection on at least a portion of the image data to recognize an object and generate preliminary object detection data for the recognized object;
   instructions to track the recognized object using the preliminary object detection data, while transmitting the at least a portion of the image data to a remote server for confirmation of the recognized object and refinement of the preliminary object detection data;
   instructions to receive from the remote server object data for the recognized object in the transmitted image data, the object data including data for an object reference frame for rendering on a display of the mobile device; and
   instructions to refine tracking of the recognized object based on the received object data and the preliminary object detection data, wherein the tracking commences on the mobile device using the preliminary object detection data and continues after receiving the object data from the remote server using both the preliminary object detection data and the received object data.

13. A system, comprising:
a memory or storage device storing a program; and
at least one processor that executes the program, wherein said execution of the program causes the at least one processor to:
   capture digital image data using a camera of a mobile device;
   perform preliminary object detection on at least a portion of the image data to recognize an object and generate preliminary object detection data for the recognized object;
   track the recognized object using the preliminary object detection data, while transmitting the at least a portion of the image data to a remote server for confirmation of the recognized object and refinement of the preliminary object detection data;
   receive from the remote server object data for the recognized object in the transmitted image data, the object data including data for an object reference frame for rendering on a display of the mobile device; and
   refine tracking of the recognized object based on the received object data and the preliminary object detection data, wherein the tracking commences on the mobile device using the preliminary object detection data and continues after receiving the object data from the remote server using both the preliminary object detection data and the received object data.

14. The system of claim 13, wherein said execution of the program causes the at least one processor to:
   repeat the acts of capturing, transmitting, receiving, and tracking.

15. The system of claim 13, wherein the preliminary object detection comprises a coarse-grained detection of text objects in the image data or a speculative detection of areas of interest in the image data.

16. The system of claim 13, wherein said execution of the program causes the at least one processor to refine the preliminary object detection based at least in part on the received object data, wherein the refining the preliminary object detection involves at least one of:
   eliminating one or more objects recognized through the preliminary object detection; and
   receiving a translated text object associated with text in the preliminary object detection data.

17. The system of claim 13, wherein said execution of the program causes the at least one processor to:
   capture one or more additional instances of digital image data using the camera; and
   track changes in a location of the recognized object in the one or more additional instances of digital image data, the tracking being performed based at least in part on the object data received from the remote server.

18. The system of claim 17, wherein the tracking further causes the at least one processor to update the data for the object reference frame for the one or more additional instances of digital image data; and
   wherein said execution of the program causes the processing unit to displaying the one or more additional instances of digital image data on the display of the mobile electronic device together with the updated object reference frame for the recognized object.

19. The system of claim 13, wherein the transmitting and the receiving reduces a computational burden on the mobile device relative to performing object recognition only on the mobile device itself.

20. The system of claim 13, wherein said execution of the program causes the at least one processor to transmit sensor data to the remote server in addition to the at least a portion of the image data;
   wherein the sensor data further comprises one or more of data from an accelerometer associated with the mobile device, data from a compass associated with the mobile device, data from a gyroscope associated with the mobile device, or data associated with global positioning system coordinates for the mobile device; and
   wherein the object data comprises data predicting a location of the recognized object based at least in part on the transmitted sensor data.

* * * * *